July 15, 1941.          H. HENRIKSEN          2,249,382
FISHING PARAPHERNALIA
Filed Feb. 24, 1941
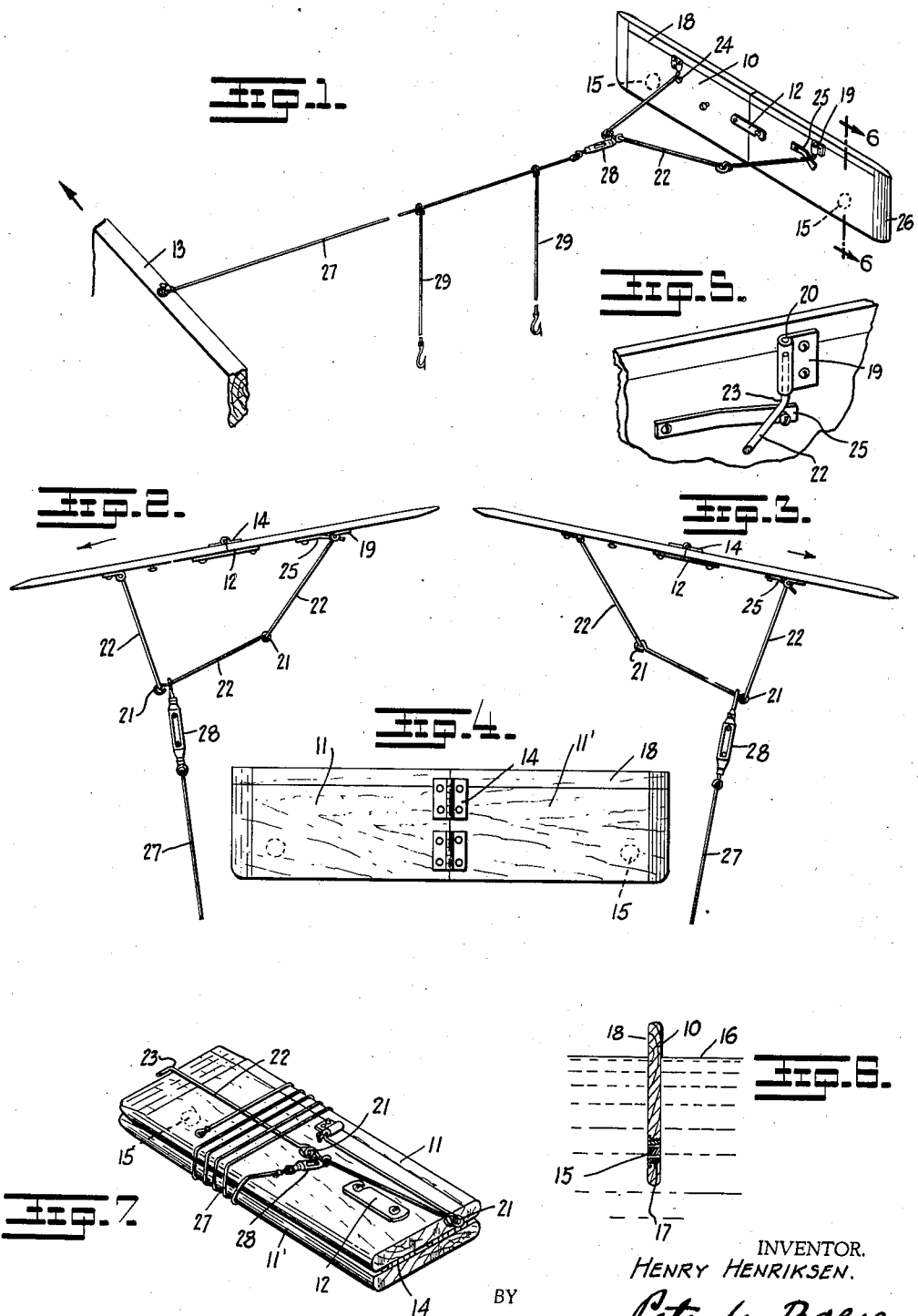
INVENTOR.
HENRY HENRIKSEN.

Patented July 15, 1941

2,249,382

UNITED STATES PATENT OFFICE 2,249,382

FISHING PARAPHERNALIA

Henry Henriksen, New York, N. Y.

Application February 24, 1941, Serial No. 380,318

3 Claims. (Cl. 43—49)

This invention relates to new and useful improvements in fishing paraphernalia, and it has for its object to provide a device which will permit the use of a great number of fishing lines and the manipulation of those from a boat in such a manner that obstacles unexpectedly met may deftly be avoided by the proper operation to which my said device will readily lend itself.

My device is equally adaptable to fresh and salt water fishing, and may be made of any suitable material.

As my device is comparatively simple of construction, the cost of manufacturing the same would be small, thus assuring a great market for my said device.

With the above and other objects in view, this invention consists of the novel features of construction, combination, and arrangement of parts, hereinafter fully described, claimed and illustrated in the accompanying drawing, forming part of this specification, and in which similar characters of reference indicate corresponding parts in all views, and in which:

Figure 1 is an asymmetric view of my device.

Figure 2 is a top plan view of the same in operation.

Figure 3 is another top plan view of my device in a different position during operation.

Figure 4 is a rear elevational view of the floating member, forming part of my device.

Figure 5 is a side elevational view, with part broken off, showing a detail construction of my device.

Figure 6 is a transverse sectional view, taken on the line 6—6 in Figure 1; while Figure 7 is a top plan view, showing my device in folded position.

Referring more particularly to the drawing, 10 indicates a member adapted to float in either fresh or salt water, alongside a boat 13.

Said member may be made of any suitable material, preferably wood.

While the said member may, of course, be made in one unit, it is illustrated herein as consisting of two parts 11 and 11', which parts are hingedly connected together, as indicated at 14 in Figure 4; this is for the sake of permitting the folding of said member 10 upon itself, as illustrated in Figure 7, thereby facilitating the transportation of the device.

The member 10 is, when in operation, in an extended or unfolded position, as shown in Figure 1, and it is in this case held rigidly in the extended position by means of a clasp 12.

The member 10 is provided with weights 15, 15 upon each side thereof in order to secure said member in a substantially vertical position in the water 16. Said weights consist in the present instance of lead-portions secured in suitable holes 17 in the member 10, but said weights may naturally be of different material and be secured in a different manner than shown.

Said weights are proportioned to the material of which the member 10 is made, so as to leave an upper margin 18 of the latter above the water line; this margin would naturally with equal weights be different in fresh and salt water.

Brackets 19, 19, bent to form tubular openings 20, 20 are arranged upon one side of the member 10, and rods 22, consisting of springy steel wires linked together by means of eyelets 21, are secured to said brackets as each outer rod has one end thereof bent to form a small portion 23, as shown in Figure 5, adapted for insertion into said tubular opening 20.

The one end portion 23 is fixedly secured in the bracket 19 by means of a stud or screw 24, while the other end portion 23 is secured by a spring steel lug 25, so that this latter end portion 23 may be disengaged by manipulating said lug 25; this arrangement being mainly for the sake of permitting the folding of the member 10.

It is evident that while the linked rods 22 are thus inserted in the brackets from below, they may as well be inserted into said brackets from above. The said member 10 is formed with tapered end portions, as shown at 26 in Figure 1.

A main line 27 of sufficient strength, as used for fishing, is slidably connected to the center linked rod 22 by means of a swivel attachment, as shown at 28.

The line 27 has a number of fishing lines 29, 29 attached thereto, and is operated by a person sitting in the boat 13.

The operation of my device is mainly as follows:

When a boat is moving along in the water, the member 10 will, after having been let out a certain distance from the side of the boat, move along with the latter in the same direction and at a slight angle thereto; in this case the swivel attachment, relatively to the linked rods, would be in a position as shown in Figure 1; the boat moving in the direction of the arrow.

If then an obstacle is noticed which would interfere with the movement of the member 10 along its path, the line 27 is slackened for a moment, and immediately thereafter again tightened, with the result that the swivel attachment will move back to the position, relatively to the rods, as shown in Figure 3, and the member 10 will at the same time move in a reverse direction, thus falling back some distance and thereby shifting its position relatively to the boat, whereby said obstacle may be avoided. The obstacle may be a rock, another fishing boat, or a different object.

When desired, the member 10 may again be brought into its first position and forward motion by bringing the swivel attachment into the position shown in Figure 1 through manipulation of the line 27.

It is obvious that slight changes may be made in the form, construction and arrangement of the several parts, as shown, within the scope of the appended claims, without departing from the spirit of the invention, and I do not, therefore, wish to limit myself to the exact construction and arrangement shown and described herein.

What I claim, as new, and desire to secure by Letters Patent of the United States, is:

1. A fishing paraphernalia comprising a floating member, brackets formed with tubular openings therein, and being secured to one side of the latter, a plurality of rods linked together and being turnably secured in said tubular openings, a line having a plurality of fishing lines secured thereto, and swiveling means slidably connecting the line to said rods, substantially as and for the purpose set forth.

2. In a device, as claimed in claim 1, and wherein a springy lug is adapted to detachably secure one end of one of said rods to a bracket.

3. In a device of the class described, a floating member comprising two sections hingedly connected, said member being formed with tapered end portions, a clasp rigidly securing said members in an extended position, brackets formed with tubular openings therein and being secured to said member, a plurality of rods linked together, the outermost of said rods having one end thereof bent and adapted for engagement with the tubular openings, a spring-lug connected to said member and made to detachably secure one end of one of said outermost rods in one of said tubular openings, a line having a number of fishing lines attached thereto, and a swiveling joint slidably connecting said line to one of said rods.

HENRY HENRIKSEN.